Figure 1:
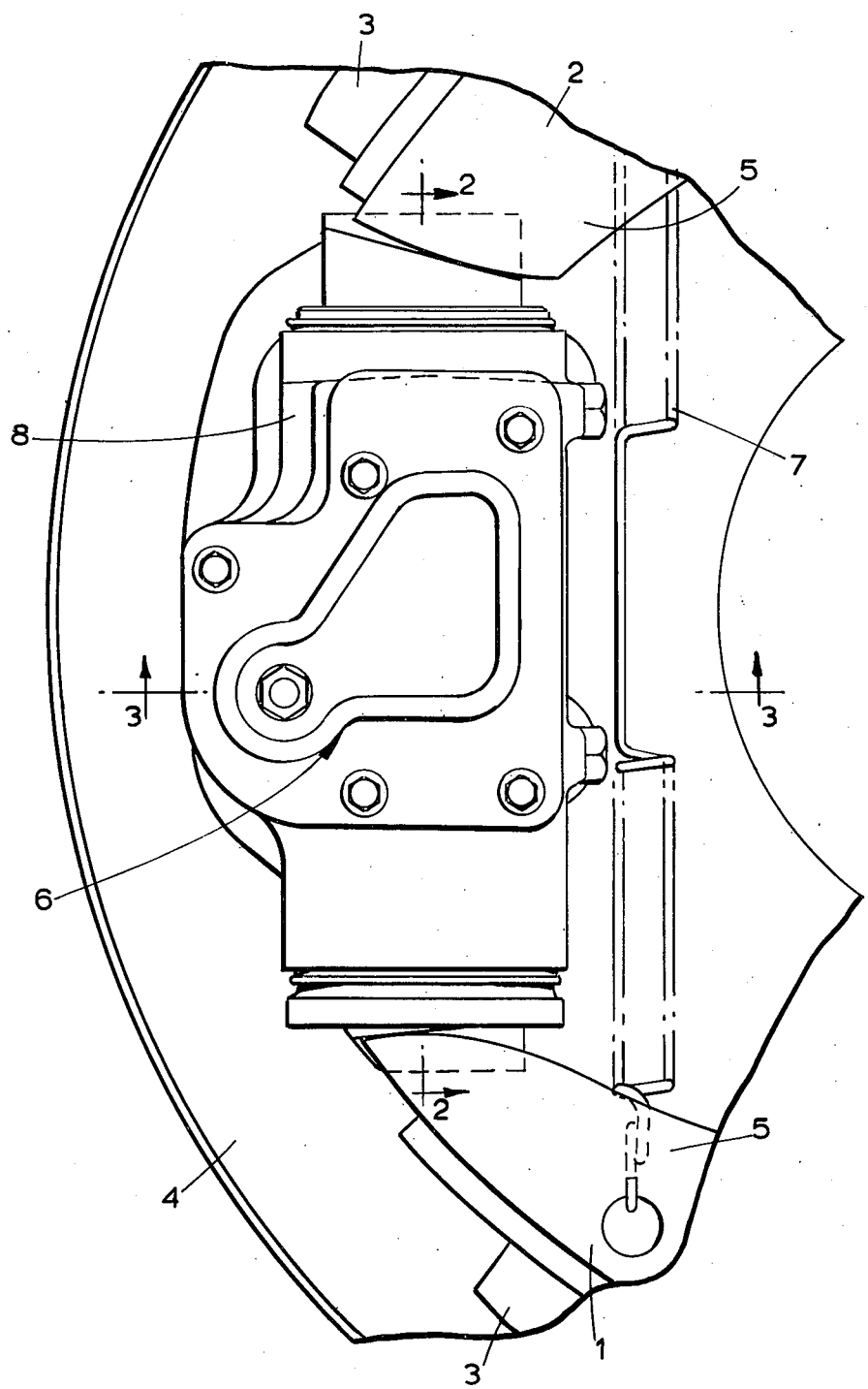

United States Patent [19]
Hill

[11] 3,882,974
[45] May 13, 1975

[54] AUTOMATIC SLACK ADJUSTER FOR A VEHICLE BRAKE

[75] Inventor: Albert Charles Hill, Birmingham, England

[73] Assignee: Girling Limited, Birmingham, England

[22] Filed: Dec. 7, 1973

[21] Appl. No.: 422,967

[30] Foreign Application Priority Data
Jan. 23, 1973 United Kingdom................. 3304/73

[52] U.S. Cl...................... 188/196 D; 188/79.5 GE
[51] Int. Cl............................................ F16d 65/56
[58] Field of Search.... 188/71.9, 79.5 GE, 79.5 GT, 188/196 D, 196 BA

[56] References Cited
UNITED STATES PATENTS
3,068,964   12/1962   Williams et al............. 188/79.5 GE
3,200,909   8/1965   Swift........................... 188/79.5 GT
3,550,732   12/1970   Beller............................ 188/196 D Primary Examiner—Duane A. Reger
Attorney, Agent, or Firm—Scrivener Parker Scrivener and Clarke

[57] ABSTRACT

An automatic slack adjuster for a vehicle brake comprises a two part strut assembly having a non-reversible screw-threaded connection and of which the effective length can be increased to maintain braking clearances of a constant value. One of the parts is provided with a separate helically inclined surface with which engages a complementary helical surface on adjusting means adapted to rotate that part with respect to the other to increase the effective length of the strut assembly.

11 Claims, 3 Drawing Figures

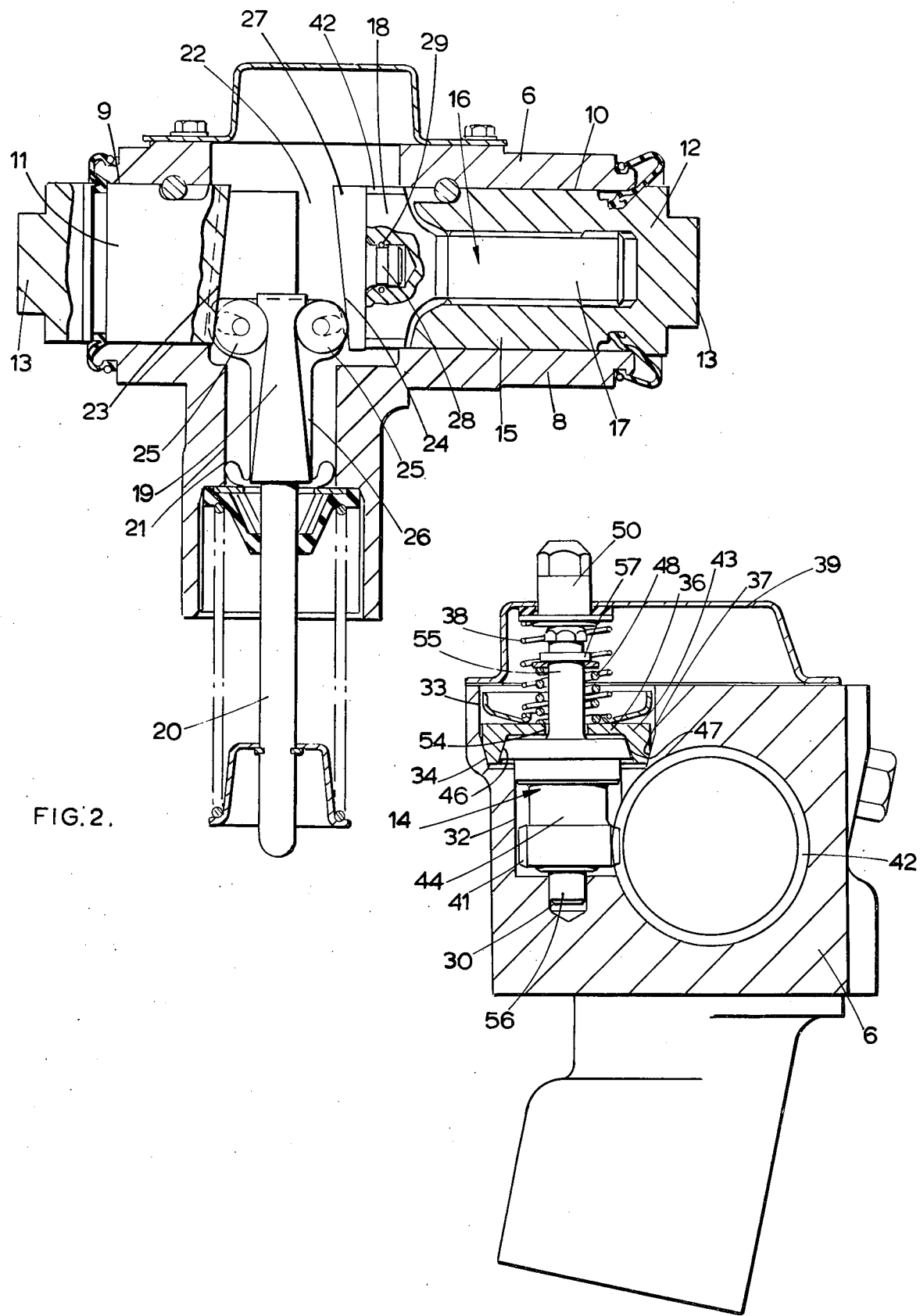

AUTOMATIC SLACK ADJUSTER FOR A VEHICLE BRAKE

This invention relates to improvements in automatic adjusters for vehicle brakes of the kind comprising a two part strut assembly of which the effective length is adapted to be increased automatically to maintain at a substantially constant value the braking clearance between the member and a rotatable braking surface, relative rotation between the parts to increase the effective length of the strut assembly being controlled by adjusting means.

In an automatic adjuster of the kind set forth difficulty is experienced in accommodating the adjusting means without increasing the overall length of the strut assembly and in a manner which permits the adjusting means to be replaced easily.

According to our invention in an automatic adjuster of the kind set forth for a vehicle brake the parts of the strut assembly have a non-reversible screw-threaded connection and one of the parts is provided with a separate helically inclined surface with which engages a complementary helical surface on the adjusting means, the said one part being rotatable relative to the other part to increase the effective length of the strut assembly and maintain the braking clearance at a substantially constant value.

Thus, the adjusting means are separate from the strut assembly that the overall length of the strut assembly is not increased. Furthermore the adjusting means can be replaced easily and independently of the strut assembly.

The helical surfaces comprise meshing helical gears provided with a degree of back-lash of a predetermined value which is taken up to cause rotation of the adjusting means from one datum position to a other datum position only when the movement of the strut assembly in a brake applying direction has exceeded the predetermined value. Movement of the strut assembly in the opposite direction first takes-up the backlash and then the gears engage to cause the said one part to rotate with respect to the adjusting means which is held fast, and with respect to the said other part thereby increasing the effective length of the strut assembly. This has the advantage that the effective length of the strut assembly is adjusted automatically to compensate for wear of the friction linings, and the braking clearances are maintained at a constant value, irrespective of the degree of wear of the friction linings.

Conveniently, clutch means are incorporated to hold the adjusting means fast against rotation, at least upon movement of the strut assembly in the said opposite direction.

The adjusting means may a comprise two-part relatively rotatable assembly of which one part is provided with a part of the clutch, and the other part is provided with the helical surface, the parts are normally held against relative rotation by clutch means which is releasable in response to axial movement of the parts away from each other.

This has the advantage that the adjusting means can be rotated manually to adjust the effective length of the strut assembly, preferably by rotating only the said other part provided with the helical gear with the clutch means disengaged.

Some embodiments of our invention are illustrated in the accompanying drawings in which:

FIG. 1 is a plan view of a portion of an internal shoe drum brake for a vehicle;
FIG. 2 is a section on the line 2 — 2 of FIG. 1; and
FIG. 3 is a section on the lines 3 — 3 of FIG. 1.

In the internal shoe-drum brake illustrated in FIGS. 1 to 3 of the drawings a pair of arcuate shoes 1 and 2 carrying friction linings 3 for engagement with a rotatable drum (not shown) are mounted on a stationary back-plate 4. The shoes 1 and 2 are provided with a pair of axially spaced radial webs 5. The shoes 1 and 2 are adapted to be separated at each of both pairs of adjacent ends by means of mechanical actuators of which only one actuator is illustrated at 6. The shoes 1 and 2 are urged into inoperative positions by means of return springs connected between the webs 5 of the shoes of which only one spring is illustrated at 7.

Each actuator 6 is of the wedge-type comprising a housing 8 fixed to the back plate 4 and having a pair of aligned bores 9 and 10 in which works a pair of aligned tappets 11 and 12 for engagement at their outer ends with the ends of the shoes 1 and 2. Each tappet 11, 12 is provided at its outer end with a projection 13 of reduced dimensions which is received between the webs 5 of the shoe with which the tappet engages.

The tappet 11 is of solid construction.

The tappet 12 comprises a two-part strut of which the effective length is adapted to be increased automatically by adjusting means 14 (FIG. 3).

The two part strut comprises a hollow piston 15 working in the bore 10 and a thrust member 16 having threaded stem 17 which is carried by an enlarged head 18 and has a non-reversible threaded engagement in the piston 15. The non-reversible threaded engagement consists in selecting the pitch, flank angle, and frictional engagement between the threads to preclude relative rotation between the members in response only to a force applied to the members in an axial direction.

The tappets 11 and 12 are adapted to be urged apart at their inner ends by means of a wedge 19 which is carried at the inner end of a rod 20. The wedge 19 extends through a bore 21 normal to the bores 9 and 10 and into a chamber 22 defined within the housing between adjacent inner ends of the bores. The wedge 19 acts on inclined faces 23 and 24 at the inner ends of the tappets through rollers 25 journalled for rotation in a cage 26. Since the piston 12 is held against rotation by the engagement of the projection 13 between the shoe webs 5, to permit the thrust member 16 to rotate relative thereto in order to increase the effective length of the tappet 12, the inclined surface 24 is provided on a thrust pad 27 engaging with the inner end of the thrust member 16 and provided with a spigot 28 which is rotatably received in a recess in the head 18 in which it is retained against axial separation by means of a circlip 29.

A bore 30 is provided in the housing 6 normal to, and to one side of, the bore 10. The bore 30 is counterbored at 31 and the counterbore 31 is again counterbored at 32. The counterbore 32 is inturn counterbored at 33, and the shoulder at the step in diameter between the counterbores 32 and 33 is inclined to define a clutch face 34.

The adjusting means 14 comprises a helical gear assembly indicated at 35 of stepped outline journalled for rotation in the bore 30 and the counterbores 31–33. The assembly 35 has an annular member provided with a radial flange 36 of which a portion of the peripheral edge is inclined to define a clutch face 37 corresponding to, and for engagement with, the clutch face 34. The clutch faces 34 and 37 are normally urged into engagement by means of a compression spring 38 acting between the flange 36 and a closure plate 39 for the counterbore 33. The portion of the gear assembly 35 which is located within the counterbore 32 is provided with a helical gear 41 meshing in tangential contact with a complementary helical gear 42 in the peripheral edge of the enlarged head 18 of the thrust member 16.

Preferably, as illustrated, the helical gear assembly 35 is constructed from two separate parts 43 and 44. The part 43 comprises the annular plate provided with the flange. The part 44 is provided with the gear 41 and is rotatably mounted in the counterbore 32 with a stem fast with the base being journalled for rotation in the bore 30. The opposite end of the part 44 is provided with a stem 55 which projects through a central opening 54 in the part 43. The part 44 is normally being held against rotation relative to the part 43 by the frictional engagement of a clutch face 46 with a complementary clutch face 47 on the inner periphery of the flange 36. The faces 46 and 47 are urged into engagement by a compression spring 48 acting between the flange 36 and an abutment 57 adjacent to the free end of the stem 55.

A degree of back-lash of a predetermined value is provided between the helical gears 41 and 42 to permit the normal braking clearance and a normal brake applying movement between a friction lining of the brake and the drum to take place before adjustment can take place. In other words the brake shoes 1 and 2 can normally be applied to the drum and returned under the influence of the return springs 7 to an inoperative position defined by the engagement of the tappets with the wedge 11. Thus, when the brake is applied by operation of the actuators 6 to separate the tappets 11 and 12, normally the tappet 12 moves axially in the bore 10 with the helical gear 42 moving with respect to the gear 41 due to the back-lash.

When the movement of the tappet 12 with respect to the bore 10 in a brake applying direction exceeds the predetermined value defined by the degree of back-lash between the gears 41 and 42, the teeth of the helical gear 42 engage with the teeth of the gear 41. Initial engagement causes the helical gear assembly 35 to rise against the loading in the spring 38 with the clutch face 37 disengaging from the clutch face 34. Further movement of the tappet 12 in the same direction rotates the helical gear assembly 35. When the brake is released, the return springs 7 act through the shoes to urge the tappets 11 and 12 inwardly of their bores 9 and 10. Initial movement of the tappet 12 disengages the gear 42 from the gear 41. This permits the clutch faces 37 and 34 to re-engage under the influence of the spring 38. Upon further movement of the tappet 12 in the same direction the back-lash between the gears 42 and 41 is taken-up so that, after the gears 42 and 41 have engaged, the thrust member 16 is rotated with respect to the piston 15 to increase the effective length of the strut since the helical gear assembly 35 is held fast against rotation by the engagement of the clutch faces. Rotation of the thrust member 16 continues until the tappet 12 is returned to its inoperative retracted position. The effective length of the strut has therefore been adjusted automatically to compensate for wear of the friction linings, and the braking clearances have been maintained at a constant value, irrespective of the degree of wear of the friction linings.

Should the strut be subjected to a substantial shock loading, the part 44 of the helical gear assembly 35 can rotate with that part 44 moving axially against the loading in the spring 38 to disengage the clutch faces 37 and 34.

To reduce the effective length of the strut 12, for example when the brake shoes are replaced, the adjusting means 14 can be rotated in a direction to wind the thrust member 16 into a position 12 by rotation of a re-wind member 50 located in the opening in the closure plate 39 against which it is normally urged by means of the spring 38. The re-wind member 50 is initially axially movable against the force in the spring 38 so that a recess in its inner end receives a spigot portion of complementary non-circular outline at the free head of the stem 55.

Rotation of the re-wind member 50 to adjust the operative length of the strut is facilitated since the part 44 can be rotated independently of the flange 36 and the engagement of the clutch faces 34 and 37 does not have to be overcome. This is of particular advantage when it is necessary to adjust manually braking clearances on assembling a brake and after initial use of a brake having braking clearances in excess of normal running clearances.

It is to be understood that the helical gear assembly 35 can be displaced at any convenient attitude with respect to the axis of the strut 12 provided an appropriate angle has been selected for engagement of the helical gears 41 and 42.

I claim:

1. An automatic slack adjuster for a vehicle brake having a friction member, and a rotatable braking member with which said friction member is adapted to engage, said slack adjuster comprising a strut assembly having a first part, a second part, and a non-reversible screw-threaded connection between said first and second parts, rotatable adjusting means for rotating said parts relatively to each other to increase the effective length of said strut assembly to maintain at a substantially constant value braking clearance between said friction member and said braking member, a first helical gear on one of said first and second parts, a second helical gear on said adjusting means in mesh at all times with said first helical gear, and means defining between said gears a degree of back-lash of a predetermined value equal to said braking clearance and a normal brake applying movement, said adjusting means normally being located in a first datum position but rotatable into a second datum position only when movement of said strut assembly in a brake applying direction exceeds a said predetermined value to take up said back-lash, whereafter movement of said strut assembly in an opposite direction first takes up the back-lash and then said gears engage to cause the said one part to rotate with respect to said adjusting means which is held fast, and with respect to the other part thereby increasing the effective length of said strut assembly.

2. An automatic adjuster as claimed in claim 1, wherein said one part comprises a thrust member having an enlarged head and said second part comprises a piston guided only for axial movement, and said helical gear is provided in the peripheral edge of said enlarged head.

3. An automatic adjuster as claimed in claim 1, wherein clutch means are operative to hold said adjusting means fast against rotation at least upon movement of said strut assembly in the said opposite direction.

4. An automatic adjuster as claimed in claim 1 including a housing, wherein said adjusting means and said strut assembly are housed in different adjacent bores in said housing.

5. An automatic adjuster as claimed in claim 4, wherein said bores are normal to each other.

6. An automatic adjuster as claimed in claim 3, wherein said clutch means comprise an inclined annular clutch surface on said adjusting means, a complementary surface on said housing, and a spring for urging said clutch surface into frictional engagement.

7. An automatic slack adjuster for a vehicle brake having a friction member, and a rotatable braking member with which said friction member is adapted to engage, said slack adjuster comprising a strut assembly having a first part, a second part, and a non-reversible screw-threaded connection between said first and second parts, adjusting means for rotating said parts relatively to each other to increase the effective length of said strut assembly to maintain at a substantially constant value braking clearance between said friction member and said braking member, a helically inclined surface on one of said first and second parts, and a complementary helical surface on said adjusting means for engagement with said helically inclined surface to effect relative rotation between said first and second parts, wherein said adjusting means comprises a two-part relatively rotatable assembly of which one part is provided with an annular clutch surface and the other part is provided with said complementary helical surface, clutch means normally holding said two-parts against relative rotation but releasable in response to axial movement of said two-parts away from each other.

8. An automatic adjuster as claimed in claim 7, wherein the said one part comprises an annular plate of which the outer peripheral edge defines said clutch surface, and the said other part incorporates a stem projecting through a central opening in said plate, said clutch means comprising clutch surfaces on an inner face of said annular plate and outer face of the said other part, and a spring acting between said plate and an end of said stem which projects through said plate to urge said clutch faces into frictional engagement.

9. An automatic adjuster as claimed in claim 7, wherein a re-set member is axially movable into engagement with one of said parts of said adjusting means against the force in a return spring whereafter at least the said other part provided with said helical gear can be rotated to adjust normally the effective length of said strut assembly in response to rotation of said re-set member.

10. An automatic adjuster as claimed in claim 9, wherein said re-set member is engagable with said stem of said other part.

11. An automatic slack adjuster for a vehicle brake comprising a strut for transmitting braking loads to a friction member and movable bodily in response to a brake application, said strut comprising first and second parts, means interconnecting said first and second parts for relative rotation to alter the effective length of said strut, a first helical gear for rotating one of said parts, an adjuster member, a second helical gear on said adjuster member in mesh at all times with said first helical gear and arranged for movement in a direction substantially tangential to said first helical gear, means for restricting said movement of said adjuster member in a first direction, and clearance drive means for permitting brake applying movement of said strut with respect to said adjuster member through a predetermined distance in response to a brake application and operative to move said adjuster member from a first datum position into a second datum position when said strut moves through a distance greater than said predetermined distance, said means for restricting said movement being so constructed and arranged that said adjuster member is prevented from returning to said first datum position whereby upon subsequent movement of said strut in a direction opposite to said brake applying movement upon release of the brake, engagement between said first and second helical gears causes said first helical gear to rotate and increase said effective length of said strut.

* * * * *